(12) United States Patent
Frenkel

(10) Patent No.: US 8,618,414 B2
(45) Date of Patent: Dec. 31, 2013

(54) HOLDING DEVICE FOR AN OVERHEAD LINE AND OVERHEAD LINE CONFIGURATION

(75) Inventor: Viktor Frenkel, Moscow (RU)

(73) Assignee: Lapp Insulators GmbH, Wunsiedel (DE)

( * ) Notice: Subject to any disclaimer, the term of this patent is extended or adjusted under 35 U.S.C. 154(b) by 230 days.

(21) Appl. No.: 12/771,352

(22) Filed: Apr. 30, 2010

(65) Prior Publication Data
US 2010/0276172 A1 Nov. 4, 2010

(30) Foreign Application Priority Data

Apr. 30, 2009 (DE) .......................... 10 2009 019 639

(51) Int. Cl.
*H02G 7/20* (2006.01)
*H02G 7/05* (2006.01)
*H02G 7/12* (2006.01)
*E04H 12/24* (2006.01)

(52) U.S. Cl.
USPC ............. 174/43; 174/40 R; 174/44; 174/45 R

(58) Field of Classification Search
USPC ......... 174/1, 44, 40 R, 40 CC, 40 TD, 41, 42, 174/45 R, 45 TD, 137 R, 138 R, 4 R, 43, 148, 174/149 R, 150, 161 R, 126 CP, 131 R; 191/40, 41; 248/58, 63; 339/222; 52/726.4
See application file for complete search history.

(56) References Cited

U.S. PATENT DOCUMENTS

| 3,624,268 | A | * | 11/1971 | Otsuki et al. ..................... 174/33 |
| 3,644,688 | A | * | 2/1972 | Tustin et al. ..................... 191/40 |
| 3,647,933 | A | | 3/1972 | Okada et al. |
| 7,750,236 | B2 | * | 7/2010 | Holloman ................... 174/40 R |

FOREIGN PATENT DOCUMENTS

| AT | 127271 B | 3/1931 |
| GB | 968249 A | 9/1964 |
| JP | 48044798 B | 12/1973 |

* cited by examiner

*Primary Examiner* — Hoa C Nguyen
*Assistant Examiner* — Binh Tran
(74) *Attorney, Agent, or Firm* — Laurence A. Greenberg; Werner H. Stemer; Ralph E. Locher

(57) ABSTRACT

A holding device has a supporting frame with at least two carrying legs at the respective ends of which is arranged a holding element for accommodating a conductor wire. A holding insulator extends in a longitudinal direction which is mounted between the carrying legs of the supporting frame and which has a free end for fixing to a mast crossbeam. The supporting frame is sized in such a way that the carrying legs extend in the longitudinal direction beyond the free end of the holding insulator. Furthermore, an overhead line configuration has such a specified holding device. With this device, masts which are configured for low rated voltages to be made accessible for carrying conductor wires at high rated voltages.

18 Claims, 2 Drawing Sheets

HOLDING DEVICE FOR AN OVERHEAD LINE AND OVERHEAD LINE CONFIGURATION

CROSS-REFERENCE TO RELATED APPLICATION

This application claims the priority, under 35 U.S.C. §119, of German application DE 10 2009 019 639.0, filed Apr. 30, 2009; the prior application is herewith incorporated by reference in its entirety.

BACKGROUND OF THE INVENTION

Field of the Invention

The invention relates to a holding device for an overhead line. Furthermore, the invention relates to an overhead line configuration with a holding device of this kind. In doing so, the invention concerns itself with the problem of upgrading already existing overhead line systems which are configured for transporting low rated voltages for use in a high rated voltage range.

As is known, overhead line systems are used outside towns for the transmission and distribution of electrical energy. By means of these, industry and private households are supplied with energy, sometimes over long distances. The voltage is transformed to a working voltage for everyday use at the end consumer.

When using overhead line systems, good accessibility for repairs and the short reconnection times after a fault which are achievable as a result of this are also of particular advantage.

Basically, overhead line systems can be configured for voltages of different magnitude. With overhead line systems, stringent standardized safety criteria must be complied with depending on the voltage carried. In particular, a specified safety distance must be maintained between the voltage-carrying conductor wire and the ground so that a flashover cannot occur when normal equipment passes through.

For high rated voltages, the safety distance for a live part is greater than for an existing low rated voltage. If the energy supply is upgraded from a low rated voltage to a high rated voltage, existing mast systems can no longer be used in this respect, as their height no longer guarantees the safety distance for the conductor wire. Older existing overhead line systems for low rated voltages, in particular the masts in each case, must in this respect be replaced at high cost if an upgrade is performed, as the safety regulations for carrying higher voltages cannot be fulfilled.

A holding device which has a supporting frame which is configured in the form of a leaf spring and has two holding elements for accommodating a conductor wire is shown in Austrian patent AT 127 271 B. The supporting frame has two legs between which extends a holding insulator. The holding insulator can be fixed to a mast.

A bracket with a supporting frame which is configured for holding a plurality of overhead lines is shown in published, British patent application GB 968,249 A. The frame has arms on which holding elements are fitted in which the conductor wires are held at a distance from one another defined by the arms. The frame is fixed to an insulator which can be fixed to a mast.

Japanese patent JP 48 044 798 B, corresponding to U.S. Pat. No. 3,647,933, shows a holding device in which a conductor wire is fixed to a mast by holding insulators without a supporting frame. Here, the holding insulators are movably fixed to the mast by an articulated joint. The conductor wire is carried in a holding element.

SUMMARY OF THE INVENTION

It is accordingly an object of the invention to provide a holding device for an overhead line and an overhead line configuration which overcome the above-mentioned disadvantages of the prior art devices of this general type, which makes it possible to upgrade overhead line systems which are configured for a low rated voltage to a higher voltage. A further object of the invention is to specify an overhead line configuration which includes such a holding device.

With the foregoing and other objects in view there is provided, in accordance with the invention a holding device for an overhead line. The holding device containing a supporting frame having at least two carrying legs with ends and holding elements each disposed at one of the ends of the carrying legs for accommodating a conductor wire. A holding insulator extends in a longitudinal direction and is mounted between the carrying legs of the supporting frame. The holding insulator having a free end for fixing to a mast crossbeam, the supporting frame being sized such that the carrying legs extend in the longitudinal direction beyond the free end of the holding insulator.

Accordingly, the holding device for an overhead line with a conductor wire has a supporting frame with at least two carrying legs at the respective ends of which is arranged a holding element for accommodating a conductor wire. A holding insulator extends in a longitudinal direction which is mounted between the carrying legs of the supporting frame and which has a free end for fixing to a mast crossbeam, the supporting frame being sized in such a way that the carrying legs extend in the longitudinal direction of the holding insulator beyond the free end of the holding insulator.

In a first step, the invention is based on the fact that masts for low rated voltages cannot in themselves be used for carrying conductor wires which carry higher voltages because of their restricted height.

Safety regulations determine the minimum distance of the carried conductor wire from the ground which must be maintained. As the height of masts for low rated voltages is basically defined by the distance of the conductor wires from the ground, masts configured for low voltages cannot be used for high rated voltages according to the current level of knowledge.

In a second step, the invention is based on the consideration that a mast crossbeam for carrying a conductor wire with low rated voltage is however basically arranged at a sufficient height to be able to carry a high rated voltage. The safety distance to be maintained is namely not determined by the height of the mast crossbeam as such, but by the lowest point of the conductor wire suspended between two crossbeams of adjacent masts. In particular, there is an available construction space in the area below the mast crossbeam, the dimensions of which allow the required safety distance from the ground to still be maintained. Previously however, professional circles have not ascribed any importance to this construction space.

In a third step, the invention uses this knowledge to conceive a holding device for raising the carried conductor wire which can be attached to the mast crossbeam using the lower construction space. For this purpose, the holding device has a supporting frame which is mounted in the construction space below the mast crossbeam, wherein carrying legs extending in the longitudinal direction above the mast crossbeam raise the conductor wire. As a result, the safety distance from the ground is maintained both at the mast and at the lowest point of the suspended conductor wire, enabling it to be used for carrying high rated voltages.

Surprisingly, a holding device according to the invention thereby enables masts for low rated voltage to be accessible for carrying conductor wires at high rated voltages. Already existing masts do not have to be replaced by new ones at high cost and with high logistical effort.

By using the newly recognized lower construction space, a mechanically stable structure for raising the conductor wire is achieved.

The holding device for an overhead line contains a supporting frame and a holding insulator.

By way of example, the supporting frame of the holding device can have two carrying legs, at the end of which are mounted holding elements for carrying the conductor wire. The supporting frame can be fixed suspended from a mast crossbeam by the holding insulator using fixing devices such as screws or bolts for example. A plurality of carrying legs can of course also be provided.

Because the supporting frame is sized in such a way that the carrying legs extend in the longitudinal direction beyond the free end of the holding insulator, the holding elements for carrying the conductor wire, which are fixed at the ends of the carrying legs, are positioned higher in the installed state than the mast crossbeam, as a result of which the distance of the carried conductor wire from the ground is increased compared with the previous direct fixing. This distance increases with increasing length of the carrying legs, which extend beyond the free end of the holding insulator, enabling the height of the carried conductor wire to be varied by the size of the supporting frame.

Furthermore, the size of the supporting frame or holding device can be matched with regard to its dimensions to the available construction space. As a result, the supporting frame can be used in many ways for different overhead line configurations with masts of different height.

As well as its function as an insulator, the holding insulator mounted between the carrying legs of the supporting frame can also be used for fixing the supporting frame to the mast crossbeam, and thus gives the supporting frame stability in the longitudinal direction. The holding insulator can, for example, be configured in the form of a suspension insulator, a support insulator or a shackle insulator. Parallel long-rod insulators or insulator chains can also be used, particularly for very high static requirements and high rated voltages. The holding insulator can be fixed and, in particular, tensioned before the holding device is fitted to the mast crossbeam.

The free end of the holding insulator is provided for fixing to the mast crossbeam. Different fixing devices can be used for this purpose. For example, a fixing device can be configured for a bolt or for a screw connection. The holding elements of the carrying legs can be of different shapes and sizes. For example, they can be U-shaped or rectangular, open or closed, and encompass and carry the conductor wire with a positive fit or force fit.

All in all, by using the specified holding device for overhead lines, the invention offers a completely new, cost-effective, variable and easy-to-administer option for upgrading existing overhead line systems while maintaining the previous masts with regard to their use for high rated voltages.

The carrying legs of the supporting frame can basically extend in different directions. In particular, the carrying legs can also run at an angle to one another. In an advantageous embodiment of the invention, they are aligned parallel to one another in the longitudinal direction. Because of this, the forces acting on the supporting frame are uniformly distributed while maintaining a small structural form, as a result of which the stability of the holding device is increased.

In general, the supporting frame can have different shapes. Advantageously, the supporting frame is configured essentially in a U-shape. As a result, as with the parallel carrying legs, the stability and mechanical strength of the supporting frame is increased. In particular, this enables the holding insulator to be manufactured easily and cost-effectively and easily fixed.

Preferably, a transverse bar to which the holding insulator is fixed is fitted between the carrying legs, the carrying legs being configured mirror-symmetrically with respect to the holding insulator. The transverse bar provides a secure fixing point for the holding insulator which is mounted between the carrying legs.

Furthermore, as a result of the mirror-symmetrical configuration of the carrying legs with respect to the holding insulator, it is guaranteed that the forces acting on the supporting frame are distributed uniformly onto the carrying legs and are absorbed by the holding insulator without shear forces.

In a further advantageous embodiment of the invention, the supporting frame is made of metal. The use of a metal or a metal alloy makes it possible to produce a stable supporting frame which is resistant to corrosion and has an appropriate stability so that it does not deform as a result of the forces acting on it. In addition, many easy-to-administer manufacturing methods for metal parts are known, as a result of which the production costs can be kept low.

In order to increase the safety of the holding device and to prevent a flashover occurring, the distance between the free end of the holding insulator and the supporting frame is expediently adequately sized to prevent a voltage flashover in air. The minimum distance to be maintained can be calculated for a flashover path in air as a function of the applied voltage, and the supporting frame produced and fitted in accordance with the requirements. In doing so, the supporting frame can be sized as small as possible down to the lowest minimum distance, as a result of which the mechanical strength is increased.

Basically, insulators can be configured to be either standing or suspended. Standing insulators enable lower mast heights and, because of the configuration of an overhead line configuration, provide a certain safety against the conductor wire falling. Suspended insulators can avoid larger transverse forces due to lateral deflection so that they are not subjected to any bending stress. All in all, both types of insulators can be fitted with ribs to increase the creepage distance. Both ceramic and composite insulators can be used for the submitted holding device.

In a particularly advantageous embodiment of the invention, the holding insulator is configured to insulate a potential difference of at least 30 kV. Existing overhead line systems for low rated voltages are, for example, configured for voltages in the range between 5 and 30 kV. On the other hand, new conductors for high rated voltages cover a voltage range beyond this and in particular between 70 and 130 kV. For this reason, the holding insulator must be configured for appropriate potential differences.

Long-rod insulators are usually used for voltages above 30 kV, and chain insulators are frequently used above 200 kV. Glass or ceramic is usually used for the insulator material; in particular the use of insulators made from high-strength plastic is also possible.

Advantageously, the holding insulator is configured as an insulator chain with a number of individual insulators connected one after the other. Each individual insulator is configured for a certain potential difference. As a result of connecting individual insulators one after the other, a greater overall potential difference can be bridged cost-effectively than is possible with a single insulator. In addition, the use of insulator chains provides a certain flexibility, as the number of insulators used can be adapted to suit the potential difference to be insulated.

Accordingly, the invention covers an overhead line configuration containing a holding device with a supporting frame with at least two carrying legs at the respective ends of which is arranged a holding element for accommodating a conductor wire. A holding insulator extends in a longitudinal direction which is mounted between the carrying legs of the supporting frame and which has a free end for fixing to a mast crossbeam. The supporting frame is sized in such a way that the carrying legs extend in the longitudinal direction beyond the free end of the holding insulator, a mast to which the mast crossbeam is fixed, the holding insulator being connected to the mast crossbeam, and a stabilizing insulator which supports the holding device against the mast substantially perpendicular to the longitudinal direction.

If a conductor wire in the holding elements of the carrying legs is carried over the mast crossbeam, advantageously the holding device is supported on the mast via the conductor wire by a stabilizing insulator. The holding device does not need to include any further fixing. Known devices for attaching the conductor wire can be called upon for fixing the stabilizing insulator.

The use of a stabilizing insulator guarantees the stability of the holding device. The tensile and compressive forces acting on the supporting frame are uniformly distributed as a result of fixing by the two insulators, of which the stabilizing insulator is configured for compression or tension and the holding insulator is subject to tension. By this means, the supporting frame is held in its position.

The use of two insulators—holding insulator and stabilizing insulator—in the overhead line configuration guarantees an inherently stable construction which can withstand external loading such as for example varying weather conditions, storms or the like.

The stabilizing insulator is preferably arranged substantially at right angles to the holding insulator. The angle must be matched to the forces acting in the individual case. In particular, the stabilizing insulator prevents tilting movements of the holding device at right angles to the conductor wire.

Basically, the conductor wire can also be carried by a stabilizing insulator outside the supporting frame. Preferably however, the conductor wire is supported by the stabilizing insulator between the holding elements of the carrying legs. As a result, a uniform and symmetrical carrying of the conductor wire can be guaranteed while at the same time achieving a compact configuration.

Expediently, the conductor wire and the carrying legs have a substantially equal minimum distance from the free end of the holding insulator. Maintaining the minimum distance can prevent a possible arc formation and voltage flashover. Because of the fact that the distance of the carrying legs from the free end of the holding insulator is equal, the forces which act on the supporting frame are distributed uniformly between both carrying legs, and the stability of the supporting frame is increased.

Other features which are considered as characteristic for the invention are set forth in the appended claims.

Although the invention is illustrated and described herein as embodied in a holding device for an overhead line and an overhead line configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
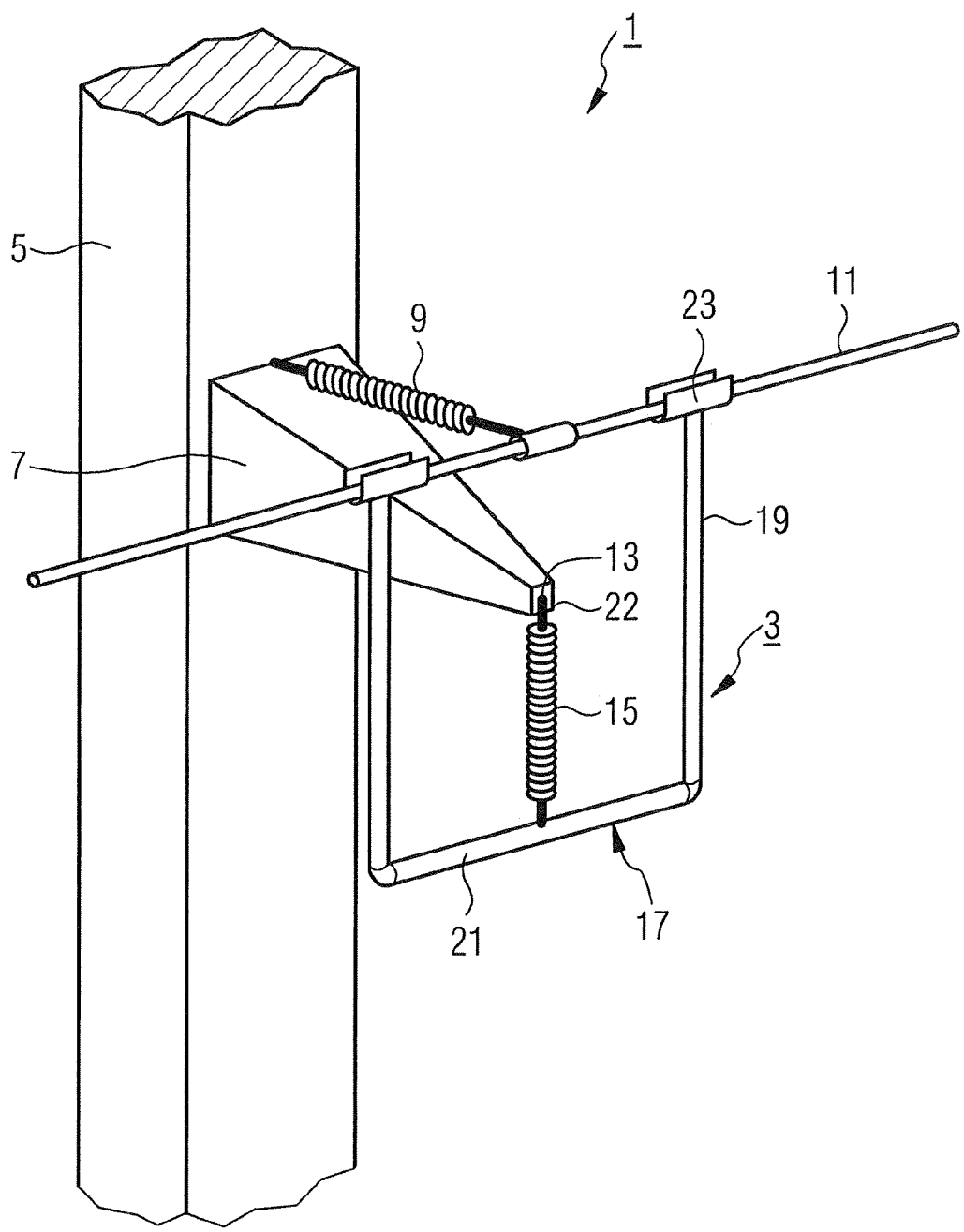
FIG. 1 is a diagrammatic, perspective view of an overhead line configuration with a holding device, wherein the individual elements of the overhead line configuration differ with respect to their geometry.

Referring now to the figures of the drawing in detail and first, particularly, to FIG. 1 thereof, there is shown an overhead line configuration 1 with a holding device 3. The overhead line configuration 1 contains a mast 5 and a mast crossbeam 7 which is fixed at right angles to the mast 5. The mast 5, which is made of metal, has a rectangular cross section. The likewise metallic mast crossbeam 7 has a cross section which tapers towards its outer end in the transverse direction.

As well as a holding insulator 15, the holding device 3 also contains a supporting frame 17 which is configured in a U-shape and in this case is made of metal. The supporting frame 17 is formed of three struts arranged at right angles to one another, namely two carrying legs 19 and a transverse bar 21 arranged between these carrying legs 19. The corners of the supporting frame 17 are rounded. It is arranged parallel to the mast 5 and connected to the holding insulator 15 in the middle of its transverse bar 21.

At the outer end of the mast crossbeam 7, the crossbeam 7 is connected to the free end 13 of a ceramic holding insulator 15 of the holding device 3. A fixing device 22 serves to provide a bolted connection.

A ceramic stabilizing insulator 9 is fixed to the contact point of the mast 5 and the mast crossbeam 7. The free end of the stabilizing insulator 9 supports a conductor wire 11.

The carrying legs 19 each have a holding element 23, which in this case is configured in a U-shape, at their ends which extend in the longitudinal direction beyond the free end of the holding insulator 15. In addition, the conductor wire 11 is supported by the stabilizing insulator 9 between these holding elements 23 of the carrying legs 19. As a result, the overall holding device 3 is supported on the stabilizing insulator 9 at right angles to the wire direction.

The carrying legs 19 are configured parallel to one another. Both the carrying legs 19 and the conductor wire 11, or the outer end of the stabilizing insulator 9, have the same minimum distance from the free end 13 of the holding insulator 15 and the mast crossbeam 7. The minimum distance guarantees that a flashover in air is prevented. Furthermore, the carrying legs 19 are arranged mirror-symmetrically with respect to the holding insulator 15.

The prescribed minimum distance or safety distance between the holding device 5 and the ground, which is not explicitly shown in the drawing, is guaranteed by the use of the holding device 3 even for a conductor wire 11 carrying high rated voltages. The safety distance to the ground at the lowest point of the suspended conductor wire 11 between two adjacent masts 5 is maintained by raising the conductor wire 11 above the mast crossbeam 7.

An additional increase in the height of the conductor wire 11 can be achieved by changing the dimensions of the supporting frame 17 or by extending the carrying legs 19.

Figure 2:
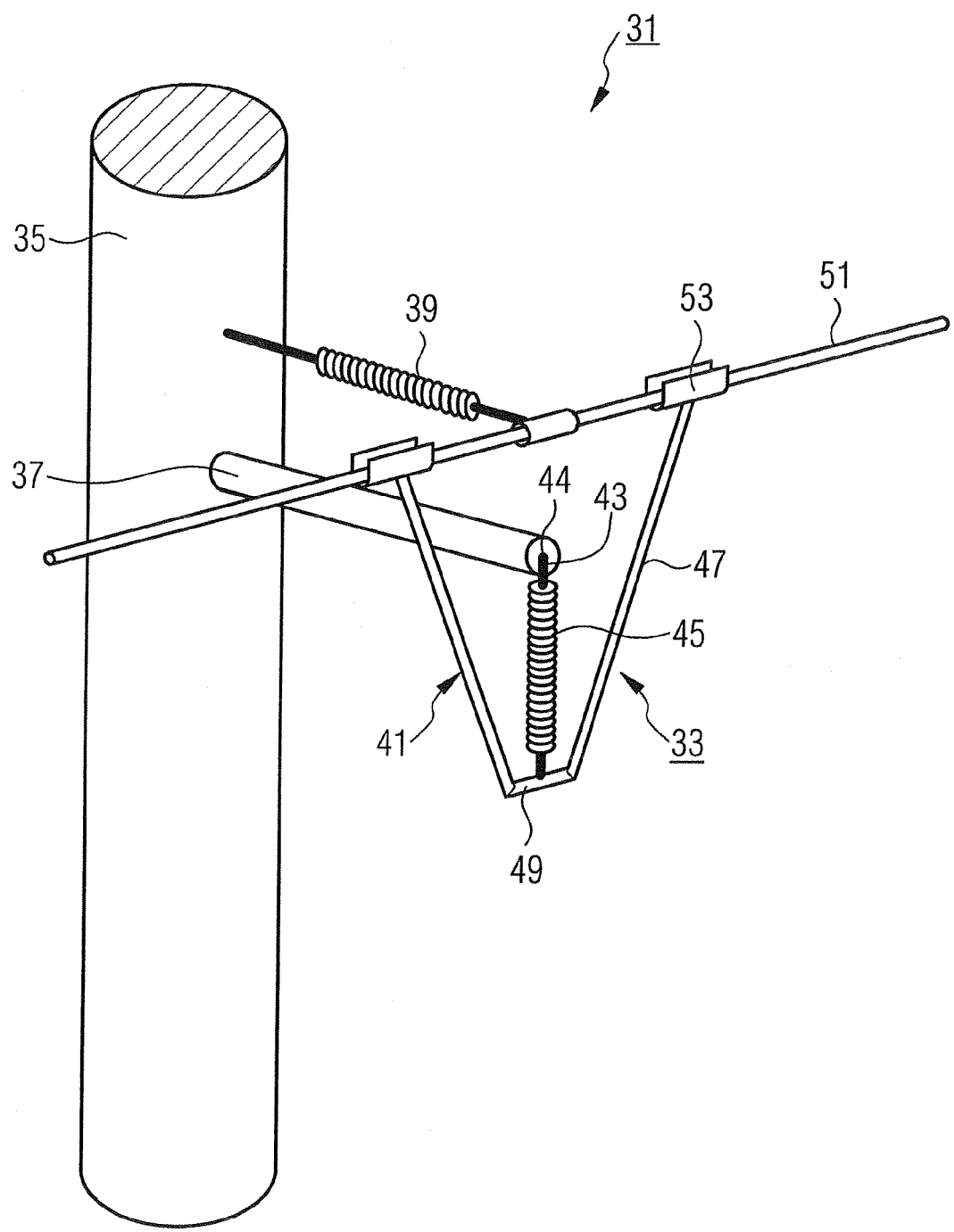
FIG. 2 is a diagrammatic, perspective view of a second embodiment of the overhead line configuration with the holding device, wherein the individual elements of the overhead line configuration differ with respect to their geometry.

FIG. 2 likewise shows an overhead line configuration 31. As in FIG. 1, the overhead line configuration 31 contains a mast 35 and a mast crossbeam 37 which is fixed approximately at right angles to the mast 35.

In contrast to FIG. 1, in FIG. 2 both the mast 35 and the mast crossbeam 37, which is fixed to the mast 35, are configured in the form of a cylinder. In FIG. 2, the stabilizing insulator 39, which is configured as a composite insulator, is fixed directly to the mast 35 and arranged parallel to the mast crossbeam 37. The supporting frame 41 is connected to the outer end of the mast crossbeam 37 by a fixing device 44 of the holding insulator 45 which is configured for a screw connection. The holding insulator 45 is likewise made as a composite insulator.

The supporting frame 41 in turn contains three struts, namely two carrying legs 47 and a transverse bar 49 arranged between these carrying legs 47. The carrying legs 47 are not arranged parallel to one another but run apart longitudinally at an angle in opposite directions. Furthermore, the carrying legs 47 are also arranged mirror-symmetrically with respect to the holding insulator 45 in this case. The conductor wire 51 is supported by the stabilizing insulator 39, which is configured as a composite insulator, between the holding elements 53 which are fixed to the ends of the carrying legs 47. In FIG. 2, both the carrying legs 47 and the conductor wire 51 have a sufficiently large distance between the free end of the holding insulator 45 and the mast crossbeam 37.

The invention claimed is:

1. A holding device for an overhead line, the holding device comprising:
    a supporting frame having at least two carrying legs with upper and lower ends and holding elements each disposed at one of said upper ends of said carrying legs for accommodating a conductor wire; and
    a holding insulator extending in a longitudinal direction and mounted between said carrying legs of said supporting frame, said holding insulator having a free end designed for fixing to a mast crossbeam, said supporting frame being sized such that said carrying legs extend in the longitudinal direction of said holding insulator beyond said free end of said holding insulator and supporting the conductor wire vertically above said holding insulator.

2. The holding device according to claim 1, wherein said carrying legs are aligned parallel to one another in the longitudinal direction.

3. The holding device according to claim 1, wherein said supporting frame is configured in a U-shape.

4. The holding device according to claim 1, wherein said supporting frame has a transverse bar to which said holding insulator is fixed and is fitted between said carrying legs, said carrying legs being configured mirror-symmetrically with respect to said holding insulator.

5. The holding device according to claim 1, wherein said supporting frame is made of metal.

6. The holding device according to claim 1, wherein a distance between said free end of said holding insulator and said supporting frame is adequately sized to prevent a voltage flashover in air.

7. The holding device according to claim 1, wherein said holding insulator is configured to insulate a potential difference of at least 30 kV.

8. The holding device according to claim 1, wherein said holding insulator is configured as an insulator chain with a number of individual insulators connected one after another.

9. An overhead line configuration, comprising:
    a mast crossbeam;
    a holding device containing a supporting frame having at least two carrying legs with ends and holding elements each disposed at one of said ends of said carrying legs for accommodating a conductor wire;
    a holding insulator extending in a longitudinal direction and mounted between said carrying legs of said supporting frame, said holding insulator having a free end connected to said mast crossbeam;
    said supporting frame being sized such that said carrying legs extend in the longitudinal direction of said holding insulator beyond said free end of said holding insulator and supporting the conductor wire vertically above said holding insulator;
    a mast to which said mast crossbeam is fixed, said holding insulator connected to said mast crossbeam; and
    a stabilizing insulator supporting said holding device against said mast substantially perpendicular to the longitudinal direction.

10. The overhead line configuration according to claim 9, wherein the conductor wire in said holding elements of said carrying legs is carried over said mast crossbeam, and said holding device is supported on said mast via the conductor wire by said stabilizing insulator.

11. The overhead line configuration according to claim 9, wherein the conductor wire is supported by said stabilizing insulator between said holding elements of said carrying legs.

12. The overhead line configuration according to claim 9, wherein a prescribed minimum distance is maintained between said holding device and the ground.

13. The overhead line configuration according to claim 9, wherein said carrying legs are aligned parallel to one another in the longitudinal direction.

14. The overhead line configuration according to claim 10, wherein the conductor wire and said carrying legs have substantially a same minimum distance from said free end of said holding insulator.

15. The overhead line configuration according to claim 9, wherein said supporting frame is U-shaped.

16. The overhead line configuration according to claim 9, wherein said holding device has a transverse bar to which said holding insulator is fixed is disposed between said carrying legs, said carrying legs being configured mirror-symmetrically with respect to said holding insulator.

17. The overhead line configuration according to claim 9, wherein a distance between said free end of said holding insulator and said supporting frame is adequately sized to prevent a voltage flashover in air.

18. The overhead line configuration according to claim 9, wherein at least one of said holding insulator and said stabilizing insulator are configured to insulate a potential difference of at least 30 kV.

* * * * *